United States Patent

Bennett

[15] 3,651,550
[45] Mar. 28, 1972

[54] METHOD OF PRELOADING A BEARING

[72] Inventor: John E. R. Bennett, Palos Verdes Peninsula, Calif.

[73] Assignee: The United States of America as represented by the Secretary of the Air Force

[22] Filed: Aug. 19, 1970

[21] Appl. No.: 65,043

[52] U.S. Cl. ........................................29/148.4 A, 308/196
[51] Int. Cl. ..............................................B23p 11/00
[58] Field of Search..............29/148.4 A, 148.4 R; 308/196

[56] References Cited

UNITED STATES PATENTS 2,606,361  8/1952  Keller ..............................29/148.4 A
2,649,808  8/1953  Slater et al. .....................29/148.4 A X Primary Examiner—Thomas H. Eager
Attorney—Harry A. Herbert, Jr. and Richard J. Killoren

[57] ABSTRACT

A method of preloading a bearing wherein races are made of steel, and spacers between the races are made of a more elastic material, such as aluminum, with the desired preload being provided by preload bolts passing through the races and spacers. The preload is adjusted by applying the desired axial load to the races without the spacers installed. The distance is then measured between fixed points on the races approximately in the plane of the ball to race contact at several points around the bearing. The spacers and closure ring are then installed and the bolts are tightened until the measured distance between the fixed points on the races are reached.

1 Claim, 6 Drawing Figures

Patented March 28, 1972
3,651,550
3 Sheets-Sheet 1
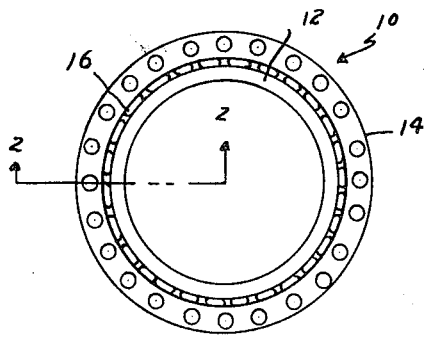
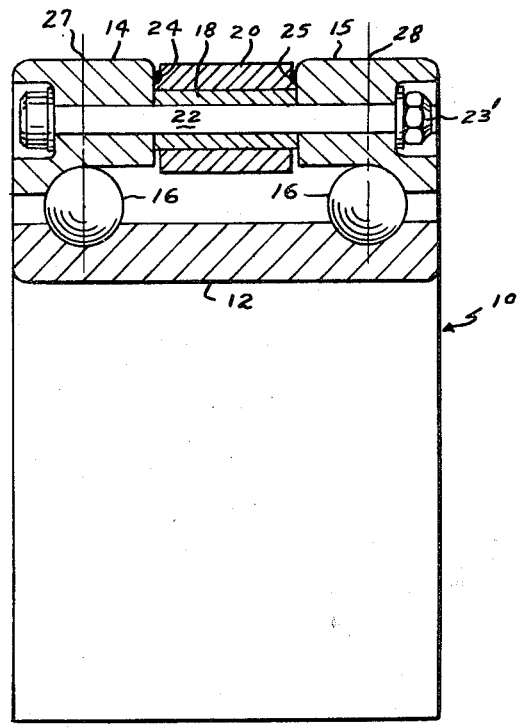
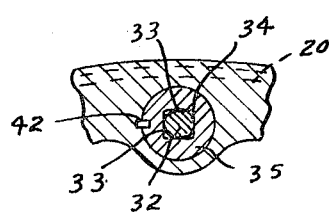
INVENTOR.
JOHN E. R. BENNETT
BY Harry A. Herbert Jr.
ATTORNEY
Richard J. Killoer
AGENT Patented March 28, 1972 3,651,550

INVENTOR.
JOHN E.R. BENNETT
BY Harry A. Herbert Jr.
ATTORNEY

Richard J. Killoren
AGENT

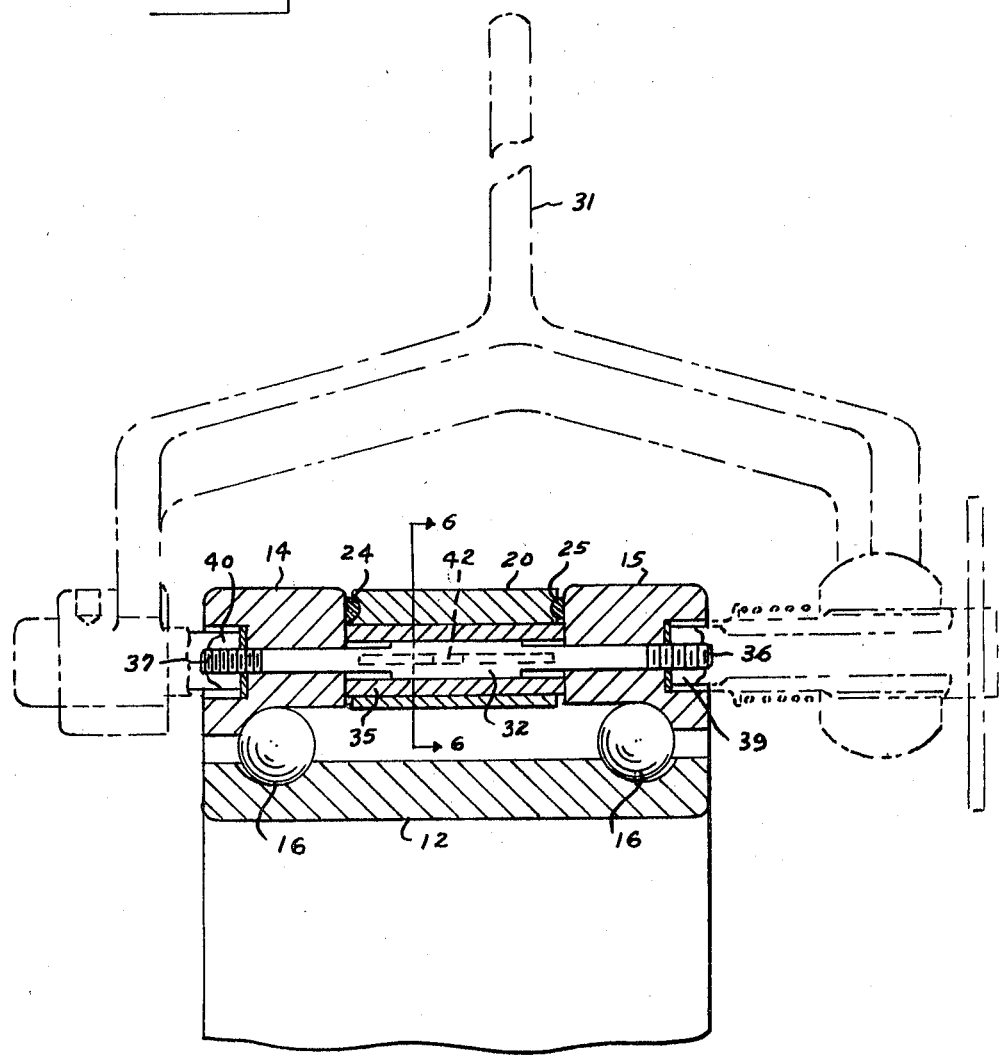

METHOD OF PRELOADING A BEARING

BACKGROUND OF THE INVENTION

Springs have been used in the past for providing preload to bearings. The use of springs for providing preload however requires that the races be free to move, which results in poor radial stiffness. Axial loading conditions and stiffness requirements sometimes preclude the use of springs as a means of applying preload. Duplex pair bearings, which consist of two single-row bearings, have been used wherein the magnitude of the preload is determined by the closure of a gap between the two races. The accuracy of machining the gap and its closure on assembly determines the accuracy and uniformity of the resulting preload.

Specific applications of duplex bearings in situations where close control of the installed bearing characteristics is mandatory, have shown that the current methods of preload applications can lead to undesirable variations in these characteristics. Even with the closest achievable gap tolerances of about 0.0002 inch for a 9 inch diameter bearing, the resulting preload can vary by 100 percent. Also extreme tolerance control is required during installation of bearings in order to prevent additional bearing preload variations. Changes can be made in the preload of the bearing only by disassembly and remachining or shimming.

BRIEF SUMMARY OF THE INVENTION

According to the method of this invention a preload is provided for a bearing wherein spacers are provided between the races of a duplex bearing, whereby a precise preload can be applied to the bearing by adjusting preloading bolts. With the races made of a material, such as steel, and the spacers made of a more elastic material, such as aluminum or magnesium, the preloading bolts are adjusted to provide the desired preload to the bearing.

IN THE DRAWINGS

FIG. 1 is an end view of a duplex bearing according to the invention.

FIG. 2 is an enlarged sectional view of the device of FIG. 1, along the line 2—2.

FIG. 5 is an enlarged partially cut away sectional view of another embodiment of the invention with an adjusting tool attached.

FIG. 6 is a sectional view of the bearing of FIG. 5 along the line 6—6.

DETAILED DESCRIPTION OF THE INVENTION

Figure 4:
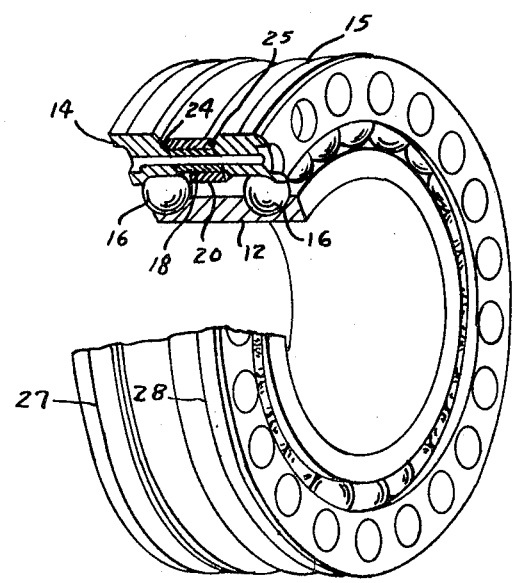
FIG. 4 is an enlarged partially cut away isometric view of the device of FIG. 1.

Reference is now made to FIGS. 1 and 2 of the drawing wherein reference number 10 shows a duplex bearing having an inner race 12 and a pair of outer races 14 and 15. A plurality of bearing balls 16 are positioned between the inner race 12 and outer races 14 and 15. A plurality of spacers 18, of a material such as aluminum or magnesium, held by closure ring 20, are located between races 14 and 15. Preloading bolts 22 pass through races 14 and 15 and spacers 18. O-ring seals 24 and 25 are provided between the races 14 and 15 and the closure ring 20. Measuring marks 27 and 28, shown in FIG. 4, are provided on races 14 and 15, respectively, approximately in the contact plane of the balls and outer race.

Figure 3:
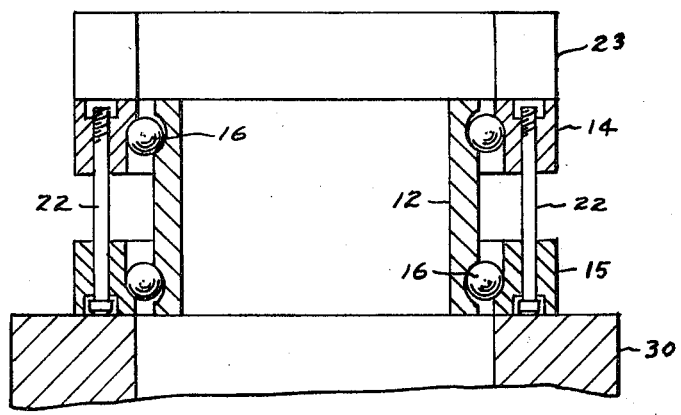
FIG. 3 shows a partially assembled bearing of the invention with a load supported thereon.

The bearing is adjusted to the proper preload first by placing the bearing on a support 30, with one of the races 15 resting on the support block as shown in FIG. 3. The closure ring 20 and spacers 18 are removed, but bolts 22 are in place. The desired load indicated schematically at 23 is placed on the upper race. The distance between the measuring marks 27 and 28 are then recorded for various positions around the bearing. These measurements may be made visually in some instances, but when very close control of bearing characteristics is required, the spacing measurements may have to be made with conventional optical measuring apparatus.

After the measurements have been made the load 23 is removed and inner race 12 is removed from race 15. The closure ring 20 and spacers 18 are then positioned over bolts 22 and the lower balls 16 and race 12 are again inserted inside race 15. The nuts 23' are then tightened on bolts 22 until the distance between measuring marks 27 and 28 are the same as with the desired load applied.

Measurements may be tabulated for different loads, if desired, so that the nuts 23' can be adjusted to provide different preloading, as needed, without again disassembling the bearing.

In the device of FIGS. 5 and 6, bolts 22 are replaced by studs 32 with different tread pitch at the two ends. The studs 32 have flat surfaces 33 which fit in the square holes 34 in spacer 35. By providing different pitch threads at the two ends, a very fine adjustment to the preloading can be made with a tool, shown schematically at 31, with nuts 39 and 40 adjusted together. For example, with 28 threads per inch at end 36, and 32 threads per inch at end 37, the stud length between the nuts would change 0.00446 inch for each turn of nuts 39 and 40, whereas the length would change 0.03571 inch with nut 39 alone turned, and 0.3125 inch with nut 40 alone turned.

Normally the spacers 18 or 35 will be held against rotation within closure ring 20 by friction between the spacers and the races; however, keys such as shown at 42 in FIG. 6 may be provided, if needed.

There is thus provided a method and apparatus for providing preload to bearings which substantially eliminates the undesirable variations in preload characteristics.

I claim:

1. The method of providing preload to a bearing having an inner race with a pair of spaced grooves, a pair of spaced outer races having oppositely directed grooves adjacent the grooves of said inner race and a plurality of ball members in the race grooves, comprising placing the bearing on a platform with one outer race in contact with the platform; applying a mass having a weight equal to the desired preload on the other outer race; recording the distance between predetermined points on the races; positioning a plurality of spacers between the outer races, passing bolts through the races and the spacers, tightening the bolts until the distance between predetermined points on the races is the same as the distance was with the mass applied to the race.

* * * * *